(12) United States Patent
Matsubara (10) Patent No.: US 10,224,021 B2
(45) Date of Patent: Mar. 5, 2019

(54) METHOD, APPARATUS AND PROGRAM CAPABLE OF OUTPUTTING RESPONSE PERCEIVABLE TO A USER AS NATURAL-SOUNDING

(71) Applicant: Yamaha Corporation, Hamamatsu-shi, Shizuoka-Ken (JP)

(72) Inventor: Hiroaki Matsubara, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 15/316,850

(22) PCT Filed: Jul. 2, 2015

(86) PCT No.: PCT/JP2015/069126
§ 371 (c)(1),
(2) Date: Dec. 7, 2016

(87) PCT Pub. No.: WO2016/002879
PCT Pub. Date: Jan. 7, 2016

(65) Prior Publication Data
US 2017/0116978 A1 Apr. 27, 2017

(30) Foreign Application Priority Data
Jul. 2, 2014 (JP) .................. 2014-136812

(51) Int. Cl.
*G10L 13/027* (2013.01)
*G10L 13/08* (2013.01)
(Continued)

(52) U.S. Cl.
CPC .......... *G10L 13/027* (2013.01); *G10L 13/047* (2013.01); *G10L 13/08* (2013.01); *G10L 15/1815* (2013.01); *G10L 15/22* (2013.01)

(58) Field of Classification Search
CPC ..... G10L 13/027; G10L 15/22; G10L 13/047; G10L 13/08
See application file for complete search history.

(56) References Cited

U.S. PATENT DOCUMENTS

| 5,357,596 A | 10/1994 | Takebayashi et al. |
| 7,047,194 B1 * | 5/2006 | Buskies ................. G10L 13/07 704/258 |

(Continued)

FOREIGN PATENT DOCUMENTS

| JP | 5-216618 A | 8/1993 |
| JP | 2002-311981 A | 10/2002 |

(Continued)

OTHER PUBLICATIONS

International Search Report (PCT/ISA/210) issued in PCT Application No. PCT/JP2015/069126 dated Aug. 18, 2015 with English translation (five pages).

(Continued)

*Primary Examiner* — Paras D Shah
*Assistant Examiner* — Oluwadamilola M Ogunbiyi
(74) *Attorney, Agent, or Firm* — Crowell & Moring LLP (57) ABSTRACT

A voice synthesizing apparatus includes: a voice inputter (102) configured to input a voice; an obtainer (22) configured to obtain a primary response to the voice inputted by the voice inputter (102); an analyzer (112) configured to analyze whether the primary response includes a repetition target; and a voice synthesizer (24) configured to, in a case where the analyzed primary response is determined to include the repetition target, synthesize a voice from a secondary response that includes the repetition target repeated at least twice to output the voice.

11 Claims, 8 Drawing Sheets

(51) Int. Cl.
*G10L 13/047* (2013.01)
*G10L 15/22* (2006.01)
*G10L 15/18* (2013.01)

(56) References Cited

U.S. PATENT DOCUMENTS

| | | | |
|---|---|---|---|
| 8,930,192 B1* | 1/2015 | Meisel | G10L 13/08 704/260 |
| 2002/0184029 A1* | 12/2002 | Brittan | G10L 13/027 704/260 |
| 2004/0002853 A1 | 1/2004 | Clavbo | |
| 2004/0229697 A1 | 11/2004 | Williams | |
| 2005/0154594 A1* | 7/2005 | Beck | G09B 19/04 704/276 |
| 2005/0171778 A1* | 8/2005 | Sasaki | G10L 13/08 704/269 |
| 2006/0020473 A1* | 1/2006 | Hiroe | G10L 13/027 704/275 |
| 2007/0208556 A1* | 9/2007 | Kwak | G06F 17/2705 704/9 |
| 2014/0012579 A1* | 1/2014 | Ganong, III | G10L 15/01 704/257 |
| 2014/0039895 A1* | 2/2014 | Aravamudan | G10L 15/187 704/257 |
| 2014/0136207 A1* | 5/2014 | Kayama | G10L 13/08 704/258 |
| 2014/0136212 A1* | 5/2014 | Kwon | G10L 15/22 704/275 |
| 2015/0220507 A1* | 8/2015 | Mohajer | H04L 51/22 704/9 |

FOREIGN PATENT DOCUMENTS

| | | |
|---|---|---|
| JP | 2003-271194 A | 9/2003 |
| JP | 2004-110673 A | 4/2004 |
| JP | 2006-528050 A | 12/2006 |
| JP | 4495907 B2 | 7/2010 |
| JP | 2010-175717 A | 8/2010 |
| JP | 2010175717 A * | 8/2010 |
| JP | 4832097 B2 | 12/2011 |
| WO | WO 02/097794 A1 | 12/2002 |

OTHER PUBLICATIONS

Japanese-language Written Opinion (PCT/ISA/237) issued in PCT Application No. PCT/JP2015/069126 dated Aug. 18, 2015 (five pages).
Japanese-language Office Action issued in counterpart Japanese Application No. 2016-531443 dated Oct. 17, 2017 with English translation (5 pages).
Nishimura et al., "Response Timing Generation and Response Type Selection for a Spontaneous Spoken Dialog System", IEEE Workshop on Automatic Speech Recognition and Understanding, Nov. 2009, pp. 462-467, Piscataway, New Jersey, XP031595368.
Extended European Search Report issued in counterpart European Application No. 15814984.9-1207 dated Feb. 2, 2018 (eight (8) pages).

* cited by examiner

METHOD, APPARATUS AND PROGRAM CAPABLE OF OUTPUTTING RESPONSE PERCEIVABLE TO A USER AS NATURAL-SOUNDING

TECHNICAL FIELD

The present invention relates to a voice synthesizing apparatus, a voice synthesizing method, and a storage medium therefor.

BACKGROUND ART

Among various voice synthesis technologies that have been proposed recently, there are included the following examples: a technology for synthesizing and outputting a voice corresponding to a user's speech tone or vocal characteristics, the object of which is to make the resulting voice more human sounding (for example, refer to Patent Document 1); and a technology for analyzing a user's voice and thereby diagnosing a psychological or physical condition of the user (for example, refer to Patent Document 2). There is also proposed an interactive voice system for use in recognizing a voice inputted by a user, and for voice-synthesizing and outputting scenario-specified content to enable voice interaction to be carried out with the user (for example, refer to Patent Document 3).

RELATED ART DOCUMENT

Patent Document(s)

Patent Document 1: Japanese Patent Application Laid-Open Publication No. 2003-271194
Patent Document 2: Japanese Patent No. 4495907
Patent Document 3: Japanese Patent No. 4832097

SUMMARY OF THE INVENTION

Problem to be Solved by the Invention

When the stated voice synthesis technologies and the interactive voice system are combined, a voice synthesizing apparatus may be envisaged that searches data and synthesizes an output voice in response to a user's voice. One drawback that has been pointed out in regard to this kind of voice synthesizing apparatuses is that the output synthesized voice is perceived by users as highly unnatural; more specifically, that the output voice sounds exactly as if a machine is talking.

In view of these circumstances, an object of the present invention is to provide a voice synthesizing apparatus, a voice synthesizing method, and a program therefor capable of generating a voice perceivable to a user as natural sounding.

Means of Solving the Problems

In order to achieve the stated object, a voice synthesizing apparatus according to one aspect of the present invention includes: a voice inputter configured to input a voice; an obtainer configured to obtain a primary response to the voice inputted by the voice inputter; an analyzer configured to analyze whether the primary response includes a repetition target; and a voice synthesizer configured to, in a case where the analyzed primary response is determined to include the repetition target, synthesize a voice from a secondary response that includes the repetition target repeated at least twice to output the voice. In the stated voice synthesizing apparatus according to the one aspect of the present invention, when the primary response includes a repetition target, the repetition target is repeated and a voice is synthesized from the repeated repetition target to be outputted. Consequently, the output voice is perceived by a user as natural sounding to such an extent that the user gains the impression that they are conversing with a human being.

In the voice synthesizing apparatus according to the one aspect of the present invention, the repetition target may be an interjection with 2 or less syllables, and the analyzer may determine whether the primary response includes an interjection, and in a case where it is determined that the primary response does include an interjection, the analyzer may analyze whether the number of syllables in the interjection is 2 or less.

In the voice synthesizing apparatus according to the one aspect of the present invention, the obtainer may include a language analyzer configured to analyze a meaning of the voice inputted by the voice inputter; and a primary response generator configured to generate a primary response that responds to the meaning analyzed by the language analyzer. By this configuration, an appropriate response to an input voice is voice-synthesized and outputted.

The voice synthesizing apparatus according to the one aspect of the present invention may further include a repeater that is configured such that in a case where it is determined that the primary response does include a repetition target, the target is repeated at least twice, and the repeated target is outputted. By this configuration, it is possible for the voice synthesizing apparatus to impart to a user the impression that the user is conversing with a human being, with emphasis being included, and an attempt at developing a rapport with the user being made.

In a configuration where a voice synthesizing apparatus includes the repeater, the voice synthesizer may, in a case where the number of syllables in the interjection included in the primary response is 2 or less, synthesize a voice from the secondary response in which the interjection that has been repeated by the repeater is included; and in a case where the number of syllables in the interjection included in the primary response is 3 or more, treat the primary response as the secondary response and synthesize a voice from the secondary response. When the number of syllables in an interjection included in the primary response is 2 or less, the interjection is repeated in a secondary response and a voice is synthesized from the secondary response. When the number of syllables in an interjection included in the primary response is 3 or more, the primary response is treated as the secondary response and a voice is synthesized from the secondary response.

The voice synthesizer may include a voice sequence generator configured to generate a voice sequence from the response and a synthesizer configured to output a voice signal that is synthesized based on the voice sequence.

The voice synthesizing apparatus according to the one aspect of the present invention may operate in a first mode or in a second mode. In the first mode, the primary response generator may be configured to generate a primary response in which an interjection and specific content are included; and in the second mode, to generate a primary response that includes either an interjection alone or the specific content alone. In the first mode, a secondary response including an interjection and specific content is generated, and when the number of syllables in the interjection is 2 or less, the interjection is repeated. In this way, a greater rapport with a user can be developed.

The voice synthesizing apparatus according to the one aspect of the present invention may operate in a prohibition mode. In the prohibition mode, the voice synthesizer may synthesize a voice without an interjection with 2 or less syllables being repeated. The reason being that mere repetition of interjections may on occasion cause discomfort in a user, depending on context. The use of the prohibition mode enables the risk of causing discomfort in a user to be reduced. In this configuration, in the prohibition mode the repeater may be configured to cancel a function to repeat an interjection with 2 or less syllables.

In addition to a voice synthesizing apparatus, the present invention may be understood as a voice synthesizing method, a program causing a computer to function as the voice synthesizing apparatus, and a computer-readable storage medium having the program stored thereon.

MODES FOR CARRYING OUT THE INVENTION

An outline of voice synthesizing apparatuses according to embodiments will be described first.

It is assumed that, during conversations between persons, one person (person "a") asks questions and another person (person "b") responds to the questions. In such a situation, when person "a" poses a question and person "b" responds to the question, person "b" sometimes repeats a part of or the entire response rather than providing a response simply as it is. For example, in Japanese when person "a" asks a question and person "b" intends to provide a positive response [ha-i] (it is to be noted here that the sound is depicted in Roman alphabet and is syllabically delimited. In the following, the expression enclosed by square brackets "[ ]" is syllabically delimited, and this format is also applicable in the drawings), person "b" sometimes repeats the response, and thus responds as [ha-i-ha-i], rather than simply responding as [ha-i].

There are also cases in which person "b" does not repeat a response to a question posed by person "a". For example, when person "a" asks a question and person "b" intends to provide a negative response in Japanese [i-i-e], person "b" will seldom respond by repeating [i-i-e] as in [i-i-e-i-i-e].

The relationship between response and repetition may be inverse depending on the subject language, despite the fact that there may be no semantic variation in the responses. For example, when person "b" provides a positive response in English "yes", person "b" will seldom respond by repeating "yes" as in "yes, yes". On the other hand, when person "b" provides a negative response in English "no", person "b" will sometimes respond by repeating "no" as in "no, no."

In another case, when person "a" asks a question in Japanese "asu wa hare?" ("Will it be sunny tomorrow?" as translated into English) and person "b" intends to provide a response [ha-i ha-re-de-su] in Japanese with a semantic content of "Yes, it will be sunny" in English, person "b" will sometimes respond by repeating [ha-i] as in [ha-i-ha-i ha-re-de-su]. However, when person "b" responds with the same semantic content in English "Yes, it will be sunny tomorrow", person "b" will seldom respond by repeating "yes", as in "Yes, yes, it will be sunny tomorrow".

Here, the inventor of the present invention considers that an important determining factor as to whether a part or a whole of a response is repeated is whether the number of syllables in an interjection included in the response is 2 or less.

This is because, as in the above example, interjections that each have 2 or less syllables, such as [ha-i] in Japanese or "no" in English, are repeated, whereas interjections that each have 3 or more syllables, such as [i-i-e] in Japanese or "yes" in English, are seldom repeated.

It is thus important to first take into account the number of syllables present in an interjection, irrespective of a language or a semantic content of a response, such as a positive or negative connotation.

Presumably, reasons that an interjection with 2 or less syllables is repeated include: to naturally and automatically provide emphasis in view of simplicity of words used; to develop a rapport; to convey that a speaker is sympathizing with or providing positive reinforcement for statements made by the other; and to avoid imparting an impression of coldness.

Here, interjections are words that do not have any conjugations and can in themselves be used to form a sentence. Interjections may include representation of emotion, responses, or addressing others. Other examples of interjections include back-channel feedbacks such as [fu-mu] or [so-u] in Japanese, "Ah" or "Oh" in English, or [shi] or [ming-ba-i] in Chinese, and also include calls of animals as described later.

Syllables are segments into which spoken sounds are divided. A syllable is a sound (or a group of sounds) typically formed by a single vowel, or a consonant or consonants attached to the head and/or the tail of the vowel, as in patterns 1 to 4 described below. A syllable refers to a unified sound when it is heard.

1. vowel (V)
2. consonant+vowel (CV)
3. vowel+consonant (VC)
4. consonant+vowel+consonant (CVC)

Syllables in Japanese include those falling under pattern 1 or 2, but do not include those under pattern 3 or 4.

It is noted that patterns 1 to 4 comprise one example approach to classifying syllables. Depending on the language, perception of a unified sound may be based on a consonant rather than a vowel. In tonal languages such as Chinese, each syllable may be formed by a combination of a vowel and consonant together with a tone generated by a variation in pitch of the vowel.

As described above, when persons are conversing, cases occur in which person "b" responds to a question posed by person "a" by repeating an interjection with 2 or less syllables. In order to provide a user with the impression that the user is conversing with a human being, voice synthesizing apparatuses according to the embodiments of the present invention are in summary configured to synthesize a voice to output a response to a question posed by a user, where an interjection included in the response is repeated at least twice if the number of syllables in the interjection is 2 or less.

As described above, the reasons for repetition of interjections that each consist of 2 or less syllables include that such interjections are so simple that they naturally and automatically tend to be emphasized. Thus, simple words that each consist of 2 or less syllables tend to be repeated regardless of whether these words are interjections. Furthermore, there may exist cases in which an interjection with 3 or more syllables is naturally and automatically repeated for confirmation. Description will be given later in which these tendencies are further considered.

In the following, details of voice synthesizing apparatuses according to the embodiments will be described with reference to the drawings.

First Embodiment

Figure 1:
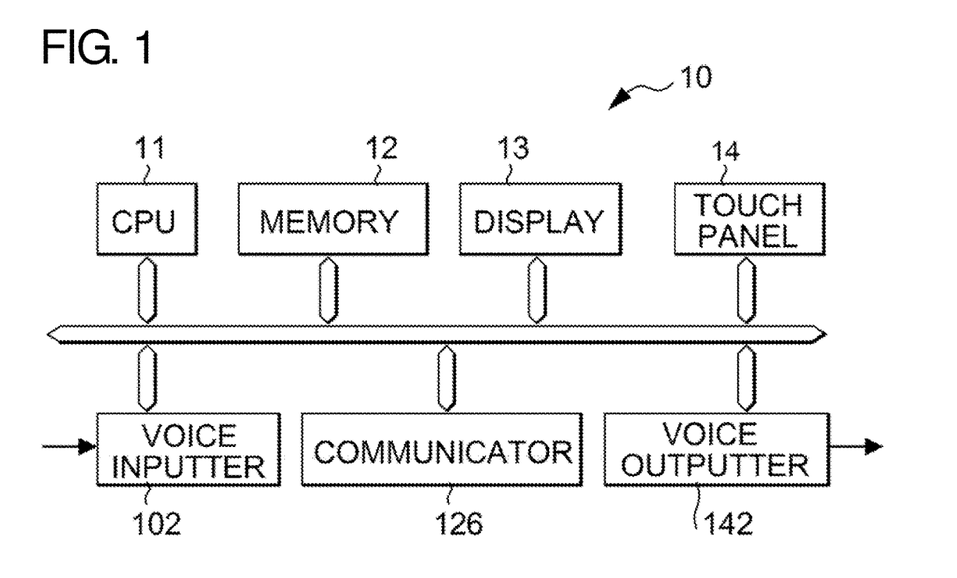
FIG. 1 is a diagram depicting a configuration of a voice synthesizing apparatus according to a first embodiment.

FIG. 1 is a diagram depicting a hardware configuration of a voice synthesizing apparatus 10 according to a first embodiment.

The voice synthesizing apparatus 10 is for example a terminal device such as a mobile phone, and includes a Central Processing Unit (CPU) 11, a memory 12, a display 13, a touch panel 14, a voice inputter 102, a communicator 126, and a voice outputter 142.

The CPU 11 controls the entire voice synthesizing apparatus 10. The memory 12 is used as a main storage of the CPU 11 and stores an application program for voice synthesis, various data, and so on. The display 13 is for example a liquid-crystal display device and displays various screens, such as those required for configuration and operation. The touch panel 14 detects touch positions on screens displayed by the display 13 and outputs information indicative of the detected touch positions.

The voice inputter 102 is formed by elements such as a microphone that converts a voice into an electrical signal, a low-pass filter (LPF) that cuts off high-frequency components from the converted voice signal, and an A/D converter that converts the voice signal with the high-frequency components cut off into a digital signal (detailed description of the voice inputter 102 is omitted). The communicator 126 communicates with an external server via the Internet, etc. The voice outputter 142 is formed from elements such as a D/A converter that converts a synthesized voice signal into an analog signal, an amplifier that amplifies the voice signal that has been converted into the analog signal, and a speaker that performs acoustic conversion of the amplified signal and outputs the same.

The voice synthesizing apparatus 10 is configured to implement functions to voice-synthesize and output responses to questions posed by a user by executing the application program. In other words, the voice synthesizing apparatus 10 is implemented by a processing device, such as a CPU, operating together with the application program.

This application program may be downloaded from a specific site over the Internet for installation on a terminal device, or may be provided pre-stored on a computer-readable storage medium, such as a memory card, to be installed on a terminal device.

In the voice synthesizing apparatus 10, the CPU 11 constructs the following functional blocks by executing the application program.

Figure 2:
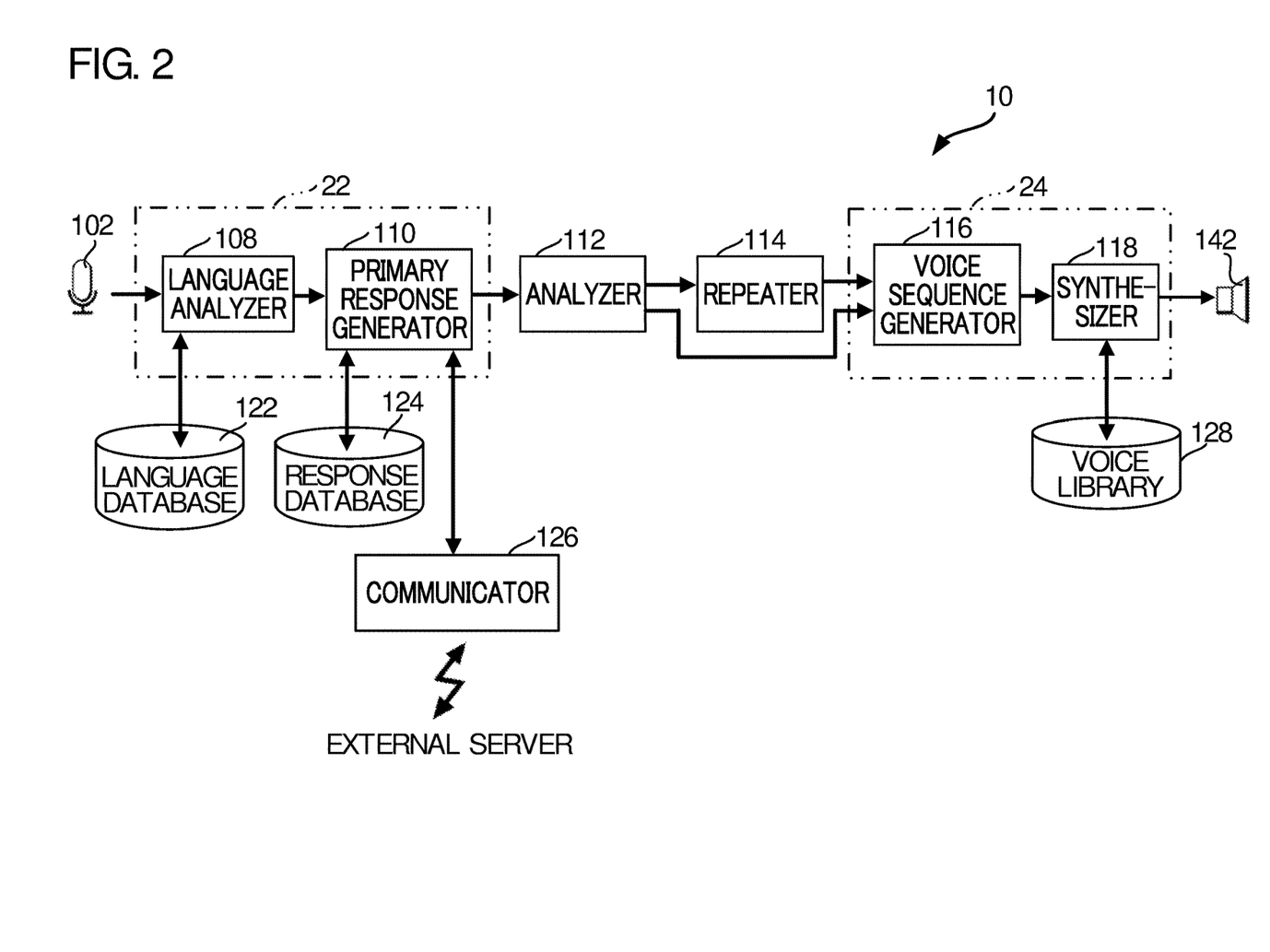
FIG. 2 is a block diagram depicting a functional configuration of the voice synthesizing apparatus.

FIG. 2 is a block diagram depicting a functional configuration of the voice synthesizing apparatus 10.

As shown in the figure, the voice synthesizing apparatus 10 includes an obtainer 22, a voice synthesizer 24, an analyzer 112, a repeater 114, a language database 122, a response database 124, and a voice library 128. The obtainer 22 includes a language analyzer 108 and a primary response generator 110, and the voice synthesizer 24 includes a voice sequence generator 116 and a synthesizer 118. Descriptions of the voice inputter 102, the communicator 126, and the voice outputter 142 have already been given above.

The language analyzer 108 analyzes (identifies) a semantic content of a voice inputted by the voice inputter 102 by processing a voice signal. More specifically, the language analyzer 108 analyzes a semantic content of words by referring to phoneme models pre-created in the language database 122 to determine to which phonemes the voice signal is proximate. The Hidden Markov Model may, for example, be used for phoneme models.

The primary response generator 110 refers to each of the response database 124 and the communicator 126 for generating a text rendition of a primary response that responds to the semantic content of a voice analyzed by the language analyzer 108.

For example, we suppose that there is a question "What time is it?" In response to this question, the primary response generator 110 obtains time information from a built-in real-time clock (not shown in the figure) and other information (e.g., a fixed phrase) from the response database 124 to generate a primary response, "It is xx:xx".

As another example, we suppose that there is a question "What will the weather be like tomorrow?" The voice synthesizing apparatus 10 is unable to generate a primary response by itself, and needs to access the external server to obtain weather information. When the primary response generator 110 is unable to generate a primary response using the response database 124 alone as in this case, the communicator 126 accesses the external server via the Internet and the primary response generator 110 obtains information necessary to generate a primary response. As described so far, the primary response generator 110 is configured to obtain, from the response database 124 or the external server, primary responses for responding to questions.

Having obtained the necessary information, the primary response generator 110 uses the fixed phrase to generate a primary response such as "it is xxx" to respond to a question. In some cases, instead of generating primary responses with specific content for responding to questions, the primary response generator 110 may generate interjections as primary responses with simple positive/negative answers such as "yes" or "no" or with back-channel feedback such as "indeed" or "good".

The term "primary responses" as used here refers to responses generated by the primary response generator 110, and to those in which interjections have not been repeated. Primary responses are so termed to distinguish them from secondary responses from which voice synthesis ultimately is performed.

The analyzer 112 first determines whether a primary response generated by the primary response generator 110 includes an interjection. In the event that the primary response does include an interjection, then the analyzer 112 analyzes the number of syllables in the interjection.

In a case where the analyzer 112 determines that the primary response includes an interjection and the number of syllables in the interjection is 2 or less, the analyzer 112 supplies the primary response to the repeater 114. In a case where the analyzer 112 determines that the primary response does not include an interjection or that the number of syllables in the interjection included in the primary response is 3 or more, the analyzer 112 treats the primary response as a secondary response and thus outputs the primary response as a secondary response to the voice sequence generator 116.

When, for example, the primary response generated by the primary response generator 110 is a statement such as "It will be sunny", the analyzer 112 determines that the primary response does not include an interjection. In contrast, in a case where the primary response consists of the Japanese word [ha-i], the analyzer 112 determines that the primary response does include an interjection and further determines that the number of syllables in the interjection is 2 or less. In a case where the primary response is the Japanese word [i-i-e], the analyzer 112 determines that the primary response includes an interjection and determines that the number of syllables in the interjection is 3 or more.

Similarly, in a case where a generated primary response is the English word "yes", the analyzer 112 determines that the primary response includes an interjection and determines that the number of syllables in the interjection is 3 or more. In a case where the primary response is the English word "no", the analyzer 112 determines that the primary response includes an interjection and determines that the number of syllables in the interjection is 2 or less.

In order to determine whether a primary response includes an interjection with 2 or less syllables, the analyzer 112 may analyze a text rendition of the primary response, or may adapt the following approach. Specifically, the primary response generator 110 may generate primary responses in such a way that interjections in primary responses are made distinguishable from other parts in the primary responses. The analyzer 112 may have different interjections that each have 2 or less syllables pre-stored and may determine that a generated primary response includes an interjection with 2 or less syllables when the primary response includes a distinguishable interjection that matches any one of the pre-stored interjections. When a primary response does not include a distinguishable interjection or when a distinguishable interjection included in a primary response does not match any of the pre-stored interjections, the analyzer 112 may determine that the primary response does not include an interjection with 2 or less syllables.

The repeater 114 repeats multiple times (twice in the first embodiment) an interjection with 2 or less syllables, and outputs the repeated interjection as a secondary response from which a voice is to be synthesized. In the above example, when a primary response generated by the primary response generator 110 consists of the Japanese word [ha-i], the repeater 114 repeats [ha-i] twice and outputs a secondary response of [ha-i-ha-i]. When a primary response consists of the English word "no", the repeater 114 repeats "no" twice and outputs a secondary response of "No, no".

The voice sequence generator 116 generates a voice sequence from a secondary response in which an interjection is repeated by the repeater 114, or from a secondary response outputted from the analyzer 112. The voice sequence generator 116 supplies the generated voice sequence to the synthesizer 118.

The term "voice sequence" here refers to data for synthesizing a voice from a secondary response. Specifically, a voice sequence consists of data that is used to specify timings, pitches, and volumes with which a voice is to be generated from a secondary response.

The synthesizer 118 synthesizes a voice based on a voice sequence and outputs the synthesized voice signal in digital form.

Here, for example, the synthesizer 118 synthesizes a voice in the following manner. The synthesizer 118 converts a content of a response defined by a voice sequence into a sequence of voice units, and selects a voice unit data that corresponds to each voice unit from the voice library 128. While correcting joins between voice unit data so as to smoothly connect voice unit data, the synthesizer 118 changes, for the connected voice unit data, respective pitches and volumes to accord with the pitches and volumes specified by the voice sequence in synthesizing a voice.

Here, the voice library 128 is a database compiled beforehand from voice unit data that is used to define waveforms of various voice units that include individual phonemes and transitions between phonemes for use as material in generating a voice.

Figure 3:
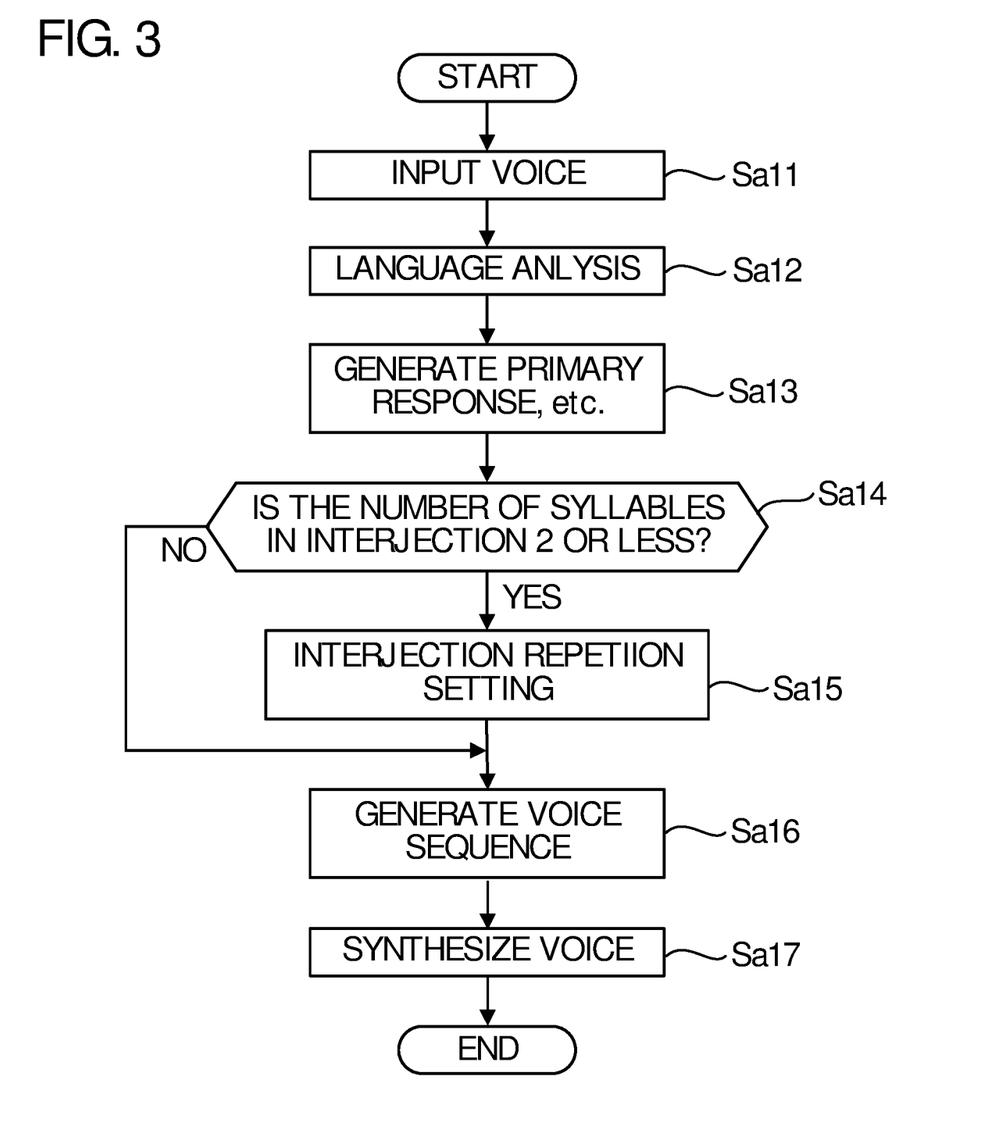
FIG. 3 is a flowchart illustrating an operation of the voice synthesizing apparatus according to the first embodiment.

Next, operations of the voice synthesizing apparatus 10 will be described. FIG. 3 is a flowchart illustrating processing in the voice synthesizing apparatus 10.

When a user performs a particular operation, e.g., when a user selects an icon corresponding to interactive processing on a main menu screen displayed on the display 13, the CPU 11 causes an application program corresponding to the processing to be executed. As a result of execution of the application program, the functional blocks shown in FIG. 2 are constructed.

When a user poses a question to the voice inputter 102 by voice, namely when a user inputs a voice into the voice inputter 102, the voice inputter 102 converts the voice into a digital voice signal and supplies the signal to the language analyzer 108 (step Sa11).

Next, the language analyzer 108 analyzes the voice signal of the question and supplies its meaning as text to the primary response generator 110 (step Sa12).

The primary response generator 110 generates a primary response that responds to the analyzed voice by referring to the response database 124 and also by referring to information obtained, as necessary, from the external server via the communicator 126, and supplies the generated primary response to the analyzer 112 (step Sa13).

The analyzer 112 determines whether the generated primary response includes an interjection and, if affirmative, proceeds to determine whether the number of syllables in the interjection is 2 or less (step Sa14). When the result of the determination is "Yes", the analyzer 112 supplies the primary response to the repeater 114. The repeater 114 repeats twice the interjection with 2 or less syllables, and supplies the repeated interjection to the voice sequence generator 116 as a secondary response from which a voice is synthesized (step Sa15).

On the other hand, when the generated primary response does not include an interjection or when the number of syllables in the interjection included in the primary response is 3 or more (i.e., when the result of the determination at step Sa14 is "No"), the analyzer 112 supplies the primary response directly to the voice sequence generator 116 as a secondary response from which a voice is synthesized.

The voice sequence generator 116 generates a voice sequence corresponding to the secondary response, which has been outputted from either the primary response generator 110 or the repeater 114, and supplies the voice sequence to the synthesizer 118 (step Sa16). Here, a timing at which the response is to be voiced and a pitch and/or volume of the response, and the like that are specified by the voice sequence may be obtained from a database (illustration is omitted in the drawings).

The synthesizer 118 synthesizes a voice from the secondary response according to the voice sequence generated by the voice sequence generator 116 (step Sa17). Although not depicted in the drawing, after a voice is synthesized from the secondary response and outputted, the CPU 11 terminates execution of the application program and the menu screen is again displayed.

Figure 4A:
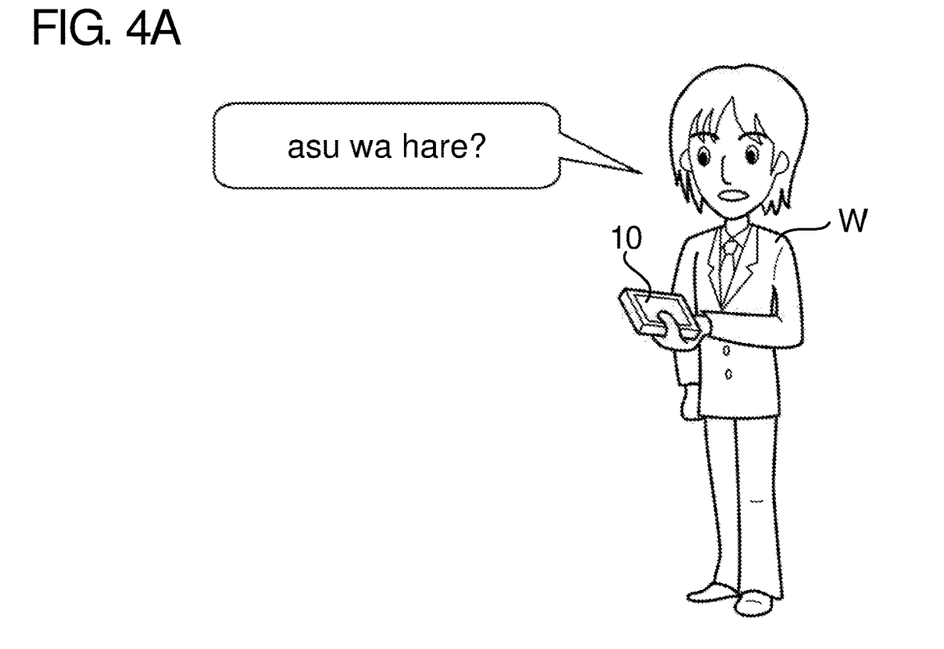
FIG. 4A is an illustration depicting an example question posed by a user.
Figure 4B:
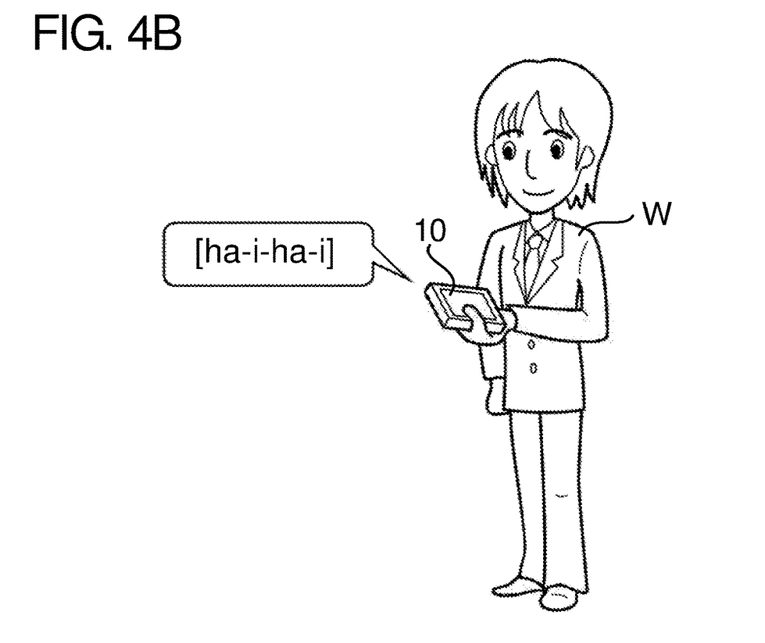
FIG. 4B is an illustration depicting an example response synthesized by the voice synthesizing apparatus.

FIG. 4A is a pictorial representation of an example question being posed by a user; and FIG. 4B is a pictorial representation of an example response to the question, the response having been synthesized by the voice synthesizing apparatus 10.

As shown in FIG. 4A, it is assumed that a user W inputs a question "asu wa hare?", in other words, a voice that requests confirmation of whether tomorrow will be sunny, into the voice synthesizing apparatus 10, which is a terminal device. In this case, we suppose that the primary response generated by the primary response generator 110 to the question is the Japanese word [ha-i], which is an affirmation, because weather information obtained via the external server indicates "sunny". This primary response includes an interjection and the number of syllables in this interjection is 2. Thus, as shown in FIG. 4B, the affirmation [ha-i] is repeated and a voice is synthesized to produce [ha-i-ha-i]. Accordingly, the user W hears a natural sounding as opposed to a mechanical response in response to his question, and thus it is as if the user W is conversing with a person. Furthermore, a greater rapport with the user W can be developed as a result of repetition of interjections.

Figure 5A:
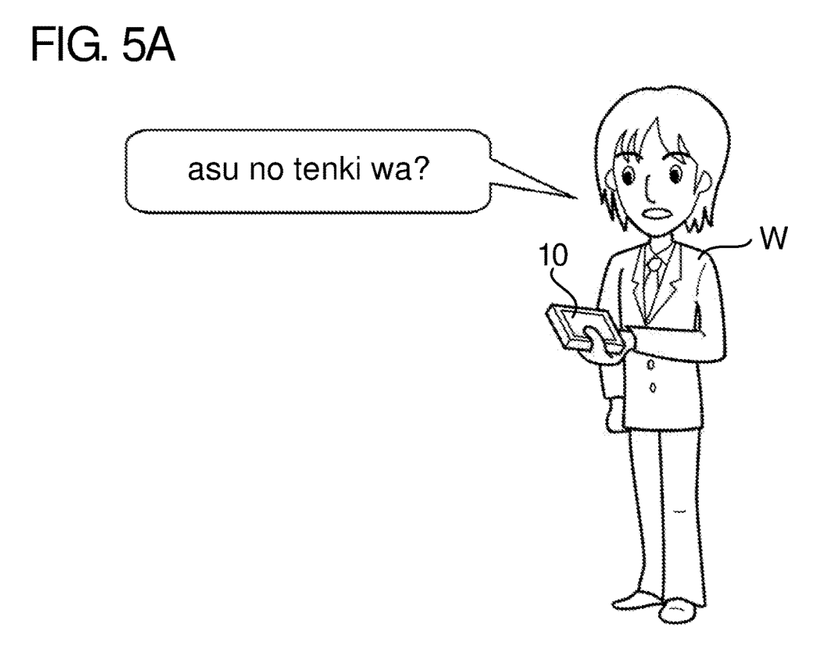
FIG. 5A is an illustration depicting an example question posed by a user.
Figure 5B:
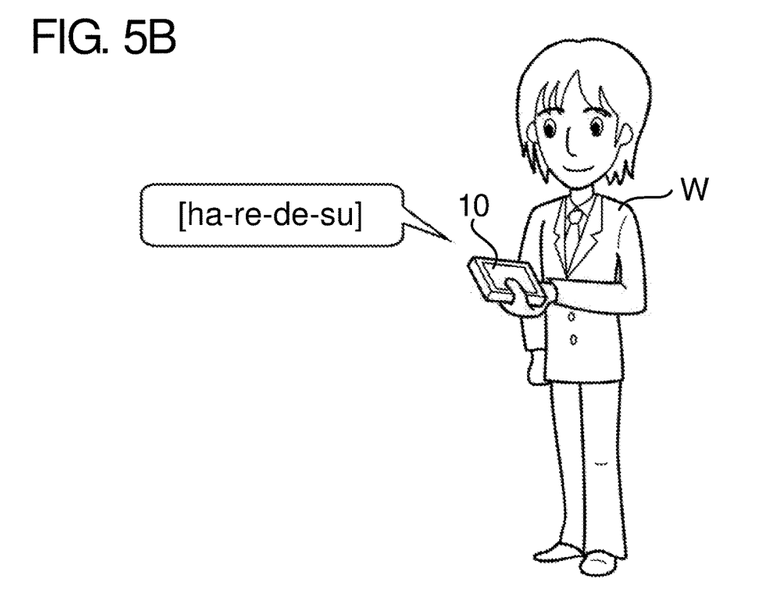
FIG. 5B is an illustration depicting an example response synthesized by the voice synthesizing apparatus.

FIG. 5A is a pictorial representation of another example question posed by a user; and FIG. 5B is a pictorial representation of an example response to the question, the response having been synthesized by the voice synthesizing apparatus 10.

In FIG. 5A, it is assumed that the user W inputs into the voice synthesizing apparatus 10 a question "asu no tenki wa?", in other words, a question that requests specific information as to what the weather will be like tomorrow. In this case, we suppose that the primary response generated by the primary response generator 110 is the Japanese phrase [ha-re-de-su] because weather information obtained via the external server indicates "sunny". Since the primary response does not include an interjection, a voice is synthesized as it is to produce [ha-re-de-su], as shown in FIG. 5B.

Here, the Japanese phrase [ha-re-de-su] means "It will be sunny" in English.

Second Embodiment

Next, description will be given of the second embodiment. In the following, reference signs used to denote elements in the first embodiment are used to denote like or similar elements, and detailed description of such elements is omitted as appropriate.

Figure 6:
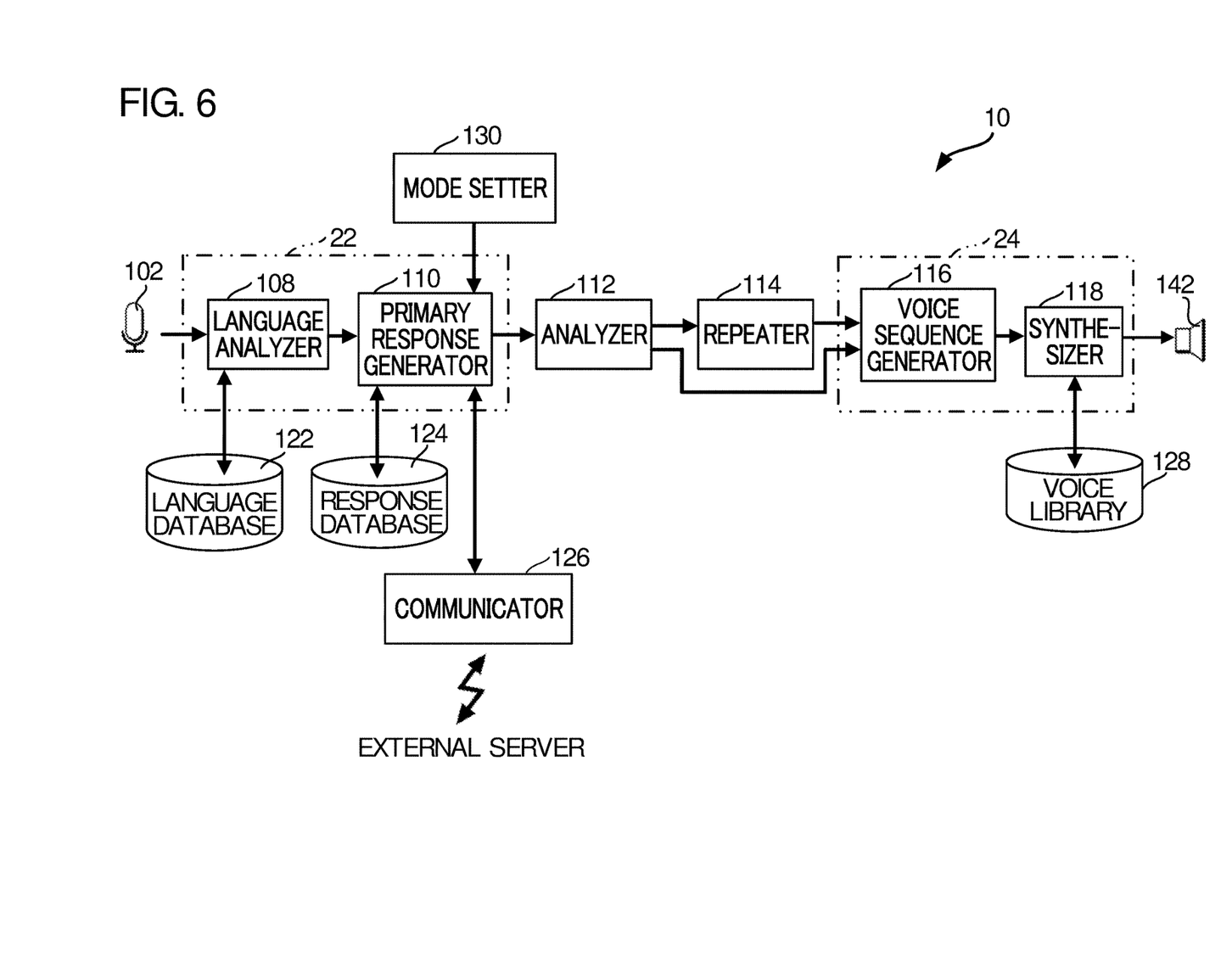
FIG. 6 is a diagram depicting a configuration of a voice synthesizing apparatus according to a second embodiment.

FIG. 6 is a block diagram depicting a configuration of a voice synthesizing apparatus 10 according to a second embodiment. FIG. 6 differs from FIG. 2 in that the primary response generator 110 generates a text rendition of a primary response that responds to a question analyzed by the language analyzer 108 according to a mode that has been configured at a mode setter 130. In the second embodiment, the mode setter 130 outputs a mode set by a user as a result of processing carried out by the CPU 11 on information outputted from the touch panel 14 (see FIG. 1).

In the second embodiment, there are 2 types of modes configurable to the primary response generator 110: a first mode and a second mode. In the first mode, even when it would be sufficient to generate a primary response that includes an interjection alone to respond to a question posed by a user, the primary response generator 110 generates a primary response that includes this interjection and specific content appended to the end of the interjection. In the second mode, when it would be sufficient to generate a primary response that includes an interjection alone to respond to a question posed by a user, the primary response generator 110 generates a primary response that includes this interjection alone. In the second mode, when it would not be sufficient to generate a primary response that includes an interjection alone to respond to the question, the primary response generator 110 generates a primary response that includes specific content alone that responds to the question.

For example, we suppose that a question "asu wa hare?" ("Will it be sunny tomorrow?") is asked. If the first mode has been set, a primary response generated by the primary response generator 110 will be [ha-i ha-re-de-su] ("Yes, it will be sunny") when the response is in Japanese and in the affirmative, for example. In other words, the primary response generator 110 generates a primary response that includes the Japanese interjection [ha-i] and specific content responding to the question, i.e., the Japanese phrase [ha-re-de-su], following the interjection.

In this example, if the second mode has been set, a primary response generated by the primary response generator 110 will be [ha-i] ("yes") when the response is in Japanese and in the affirmative, for example. That is, the primary response will include only an interjection. We suppose that a question "asu no tenki wa?" ("What will the weather be like tomorrow?") is asked in the second mode. In this case, when weather information obtained via the external server indicates "sunny", a primary response generated by the primary response generator 110 will be, as in the first embodiment, [ha-re-de-su] ("It will be sunny") when the response is in Japanese.

Next, operations of the second embodiment will be described.

Figure 7:
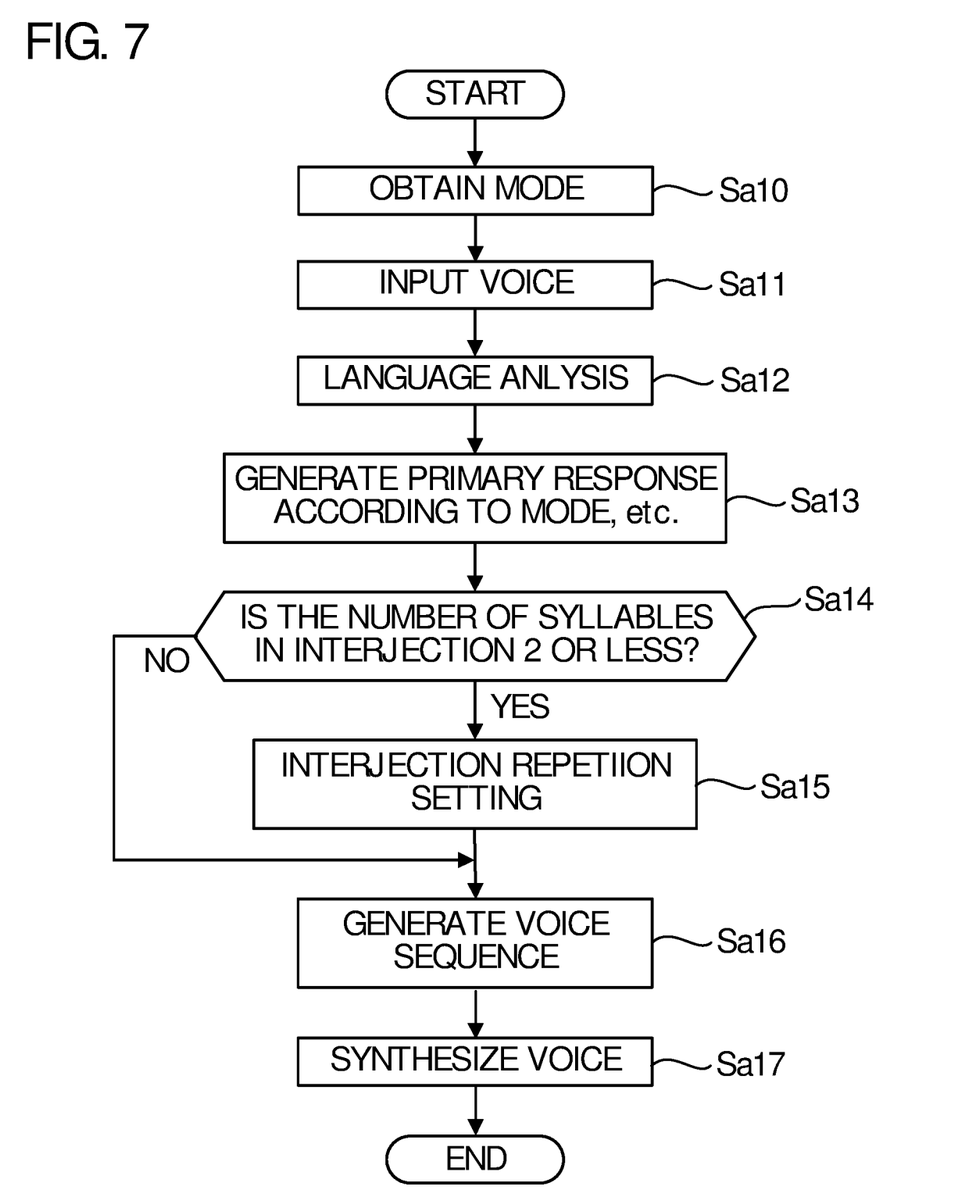
FIG. 7 is a flowchart illustrating an operation of the voice synthesizing apparatus according to the second embodiment.

FIG. 7 is a flowchart illustrating processing in the voice synthesizing apparatus 10.

FIG. 7 differs from FIG. 3 in that, for example, the primary response generator 110 retrieves the configured mode at step Sa10, which is prior to step Sa11, and that in step Sa13, according to the configured mode, the primary response generator 110 generates a text rendition of a primary response responding to the meaning of a voice analyzed by the language analyzer 108.

In the second embodiment, at step Sa14, as described above in the first embodiment, the analyzer 112 analyzes a primary response generated by the primary response generator 110 in the first or in the second mode, and if it is determined that the primary response does include an interjection, the analyzer 112 analyzes whether the number of syllables in the interjection is 2 or less.

Figure 8:
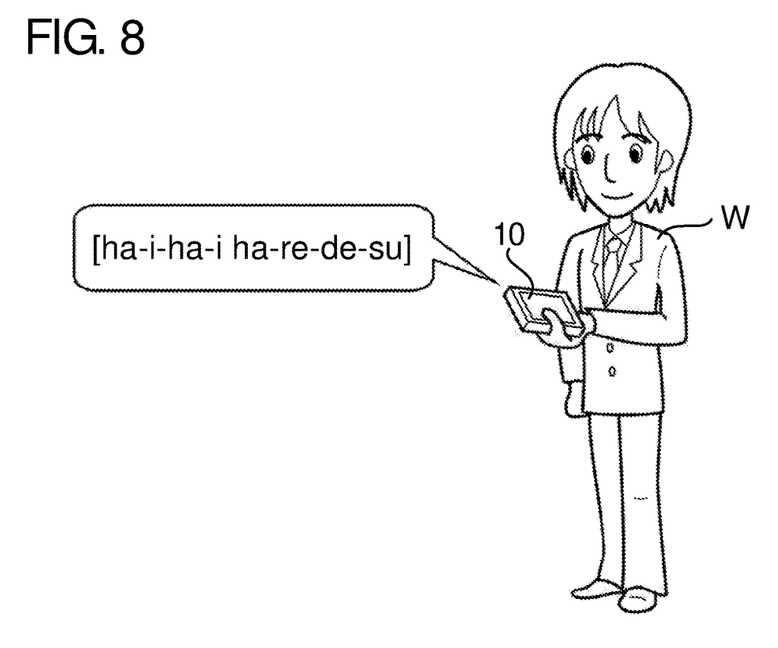
FIG. 8 is an illustration depicting an example response synthesized by the voice synthesizing apparatus.

FIG. 8 is a diagram depicting an example response synthesized by the voice synthesizing apparatus 10 according to the second embodiment. In this example, it is assumed that a user W inputs a question "asu wa hare?" ("Will it be sunny tomorrow?") as shown in FIG. 4A.

In this case, when weather information obtained via the external server indicates "sunny" and when the first mode has been set, a primary response [ha-i ha-re-de-su] ("Yes, it will be sunny") in Japanese will be generated. It is noted that, in the second embodiment, the interjection [ha-i] included in this primary response is repeated multiple times, twice in this example, and the specific content [ha-re-de-su] responding to the question follows the repeated interjection. In other words, a voice is synthesized to produce [ha-i-ha-i ha-re-de-su].

In the second embodiment, in response to a question posed by a user W, a response is voice-synthesized in which an interjection with 2 or less syllables is repeated and specific content that provides an impression of the question being confirmed follows the repeated interjection. In this way, a greater rapport with the user W can be developed.

In the second embodiment, when weather information obtained via the external server indicates "sunny" and when the second mode has been set, an interjection alone, for example the Japanese word [ha-i], will be generated. Accordingly, this interjection [ha-i] is repeated multiple times, twice in this example, and a voice is synthesized to produce [ha-i-ha-i] as shown in FIG. 4B.

Applications and Modifications

The present invention is not limited to the stated embodiments and is open to various applications and modifications including those described below. At least one of the following applications and modifications may, as appropriate, be combined with any of the stated embodiments.

Repetition Targets

In the embodiments, when a primary response includes an interjection with 2 or less syllables, a voice is synthesized in which the interjection is repeated at least twice. As already stated, simple words that each have 2 or less syllables, regardless of whether these words are interjections, tend to be repeated. Furthermore, even interjections that each have 3 or more syllables tend to be repeated.

In view of these tendencies, the analyzer 112 may analyze whether a primary response includes a repetition target (word) such as those described below, and in a case where the analyzed primary response is determined to include the target, the analyzer 112 may supply the primary response to the repeater 114.

First repetition targets may be interjections that each have 2 or less syllables, as in the embodiments. Second repetition targets may be simple words that each have 2 or less syllables, where the simple words are not limited to interjections. Third repetition targets may be interjections that each have 3 or more syllables. First repetition targets are the most preferable, and second and third repetition targets are alternatives to first repetition targets.

It may be the case that it is difficult to analyze simple words that each have 2 or less syllables due to their inherent simplicity, and the number of interjections is limited that each have 3 or more syllables and may possibly be repeated. In such cases, the analyzer 112 may analyze whether any of pre-stored targets, for example, is included in a primary response.

Voice Inputter, Etc.

In the embodiments, the voice inputter 102 is configured to convert a voice of a user inputted through the microphone into a voice signal. Alternatively, the voice inputter 102 may be configured to input a voice signal that has been processed by another processor or a voice signal that is supplied (or transferred) from another device. In other words, such an arrangement would suffice for operation of the voice inputter 102 in so far as the inputter is configured to obtain a voice one way or another.

Primary responses that respond to a semantic content of a voice are generated in text format in the embodiments, but primary responses may be generated in data format other than text, such as in sound waveform data format. When sound waveform data is used for primary responses, the existence of repetition targets may be analyzed by processing the sound waveform data. In this case, it is preferable to use sound waveform data format for secondary responses.

Here, there are advantages in generating primary responses in text format as in the embodiments. For example, precision in analyzing repetition targets is enhanced, and the approach is convenient for synthesizing voice since secondary responses will also be in text format.

Furthermore, the primary response generator 110 may directly obtain primary responses to an input voice from the external server, rather than generating primary responses by referring to fixed phrases in the response database 124. In other words, such an arrangement would suffice for operation of the primary response generator 110 in so far as the primary response generator 110 is configured to obtain a primary response to an input voice one way or another.

Prohibition Mode

In the embodiments, interjections that each have 2 or less syllables are repeated twice. In some cases, however, when [ha-i] is repeated and a voice is synthesized and outputted to produce [ha-i-ha-i], for example, such a response may sound disrespectful, and consequently discomfort may be caused in a user depending on the context.

In view of such circumstances, the voice synthesizing apparatus 10 may be provided with an operation mode (prohibition mode) in which repetition of interjections is prohibited. In the prohibition mode, the function to repeat interjections is canceled. In an example configuration in which the function to repeat interjections is canceled, the repeater 114 may be configured, when the prohibition mode has been set, so as to prohibit the function to repeat interjections. Alternatively, when the prohibition mode has been set, the analyzer 112 may be configured so as to supply a primary response generated by the primary response generator 110 directly to the voice sequence generator 116 rather than supplying the primary response to the repeater 114, even when the number of syllables in an interjection included in the primary response is 2 or less. In summary, the voice synthesizing apparatus 10 is configured such that interjections that each have 2 or less syllables are not repeated.

Figure 9:
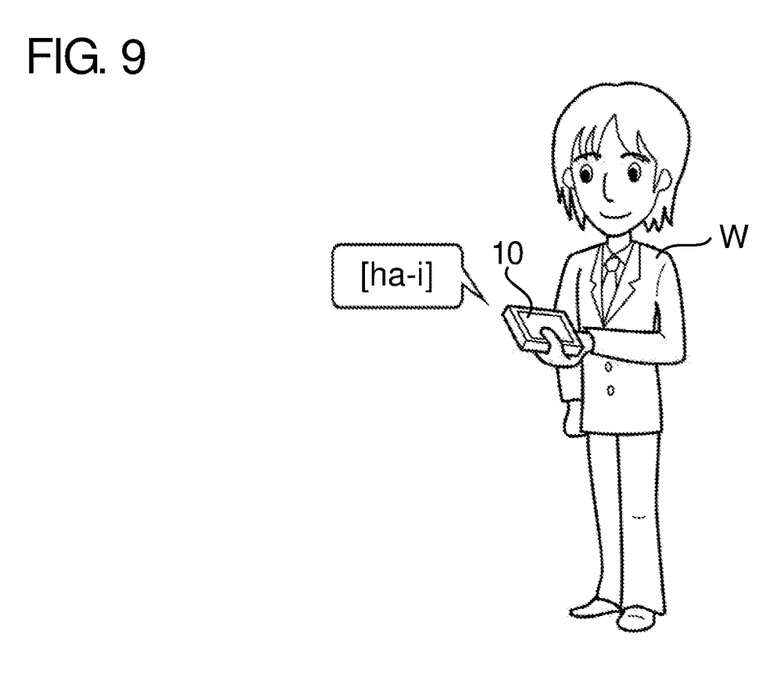
FIG. 9 is an illustration depicting an example response synthesized by the voice synthesizing apparatus.

In this way, even when a primary response generated by the primary response generator 110 is [ha-i], which has 2 or less syllables, [ha-i] will not be repeated and thus a voice will be synthesized to produce [ha-i] once only, as indicated by the primary response, as shown in FIG. 9.

The prohibition mode and the first or second mode may be manually set by a user, or may be automatically configured by the apparatus depending on the results of analyzing the content and/or volume of an inputted voice, the content of responses, histories (or circumstances) of conversations, and the like.

Voice and Response

Although in the embodiments responses are voice-synthesized based on the human voice, calls of animals may be used in addition to the human voice. In other words, repetition targets may include animal calls as well as the human voice.

For example, when a user inputs into the voice synthesizing apparatus 10 a voice indicative of a semantic content of "It's a beautiful day" irrespective of a language, the voice synthesizing apparatus 10 may repeat the "meow" sound of a cat and perform voice-synthesis so as to output the sound "Meow, meow", for example.

When the voice synthesizing apparatus 10 outputs sounds that are synthesized based on animal calls, users are not able to obtain information they wish. For example, when a user asks a question "What will the weather be like tomorrow?", the user is unable to obtain weather information for tomorrow from such a response. However, it is expected that by responding to a question posed by a user by way of an animal call, the voice synthesizing apparatus 10 may be able to provide the user with a comforting effect by providing the impression as if the user were communicating with a virtual animal that reproduces the animal call.

The use of a voice synthesizing apparatus 10 to perform voice-synthesis based on animal calls is not limited to a terminal device, and may be adapted for a pet robot that imitates the animal reproducing animal calls or for a stuffed toy.

Other Modifications

In the embodiments, repetition targets are repeated twice, but they may be repeated thrice or more.

The CPU 11 may configure the number of repetition times based on the content and/or volume of an inputted voice, the content of a response, histories (or circumstances) of conversations, etc.

In the embodiments, the language analyzer 108, the language database 122, and the response database 124, which altogether form an element for obtaining primary responses to questions, are included in the voice synthesizing apparatus 10. However, these elements may be included in the external server, considering that a processing load on a terminal device will be heavy and such devices have a relatively limited storage capacity. In other words, such an arrangement would suffice for operation of a voice synthesizing apparatus 10 in so far as the apparatus is configured to obtain primary responses to questions one way or another, and it is not stipulated whether the primary responses are generated by the voice synthesizing apparatus 10 or by another entity other than the voice synthesizing apparatus 10 (e.g., the external server).

When a voice synthesizing apparatus 10 is used in such a way that it is possible for the voice synthesizing apparatus 10 to generate a response to a voice without accessing the external server, etc., the information obtainer 126 becomes unnecessary.

The voice synthesizing apparatuses 10 according to the embodiments may be implemented by dedicated electronic circuitry or by general-purpose personal computers, as well as by terminal devices. When a personal computer is used, a voice synthesizing apparatus 10 is implemented by way of the personal computer connecting to a microphone and a speaker and executing a pre-installed application program. In this case, the application program installed in the personal computer may be downloaded via the Internet as is the case for terminal devices, or may be provided in a form of a computer-readable storage medium on which the application program has been stored. In this specification, a storage medium is for example a non-transitory storage medium, a good example of which is an optical storage medium (an optical disk) such as a CD-ROM. Examples of such a storage medium may also include a semiconductor storage medium and a magnetic storage medium.

The voice synthesizing apparatuses according to the embodiments can also be realized as voice synthesizing methods for synthesizing a voice.

DESCRIPTION OF REFERENCE SIGNS

10 . . . voice synthesizing apparatus; 22 . . . obtainer; 24 . . . voice synthesizer; 102 . . . voice inputter; 108 . . . language analyzer; 110 . . . primary response generator; 112 . . . analyzer; 114 . . . repeater; 116 . . . voice sequence generator; 118 . . . synthesizer; 126 . . . communicator.

The invention claimed is:

1. A voice processing apparatus comprising:
at least one processor configured to execute stored instructions to:
receive an inputted voice from a user and perform language analysis on the inputted voice;
obtain a primary response data representative of a response to the inputted voice from a database;
analyze whether the primary response data includes an interjection with 2 or less syllables, wherein the interjection is included in a repetition target;
in a case where the analyzed primary response data is determined to include the interjection with 2 or less syllables, generate a voice sequence from a secondary response data that includes the repetition target repeated at least twice;
synthesize a voice based on the voice sequence; and
output the synthesized voice in digital form that includes the secondary response data.

2. The voice processing apparatus according to claim 1, wherein the at least one processor is configured to:
in obtaining the primary response data, analyze a meaning of the inputted voice, and generate the primary response data as a response to the analyzed meaning.

3. The voice processing apparatus according to claim 1, wherein the at least one processor is further configured to:
in a case where the number of syllables in the interjection included in the primary response data is 3 or more, output the primary response data as the secondary response data.

4. The voice processing apparatus according to claim 3, wherein the at least one processor is further configured to:
generate a voice sequence from the secondary response data; and
synthesize a voice based on the voice sequence.

5. The voice processing apparatus according to claim 2, wherein the voice processing apparatus is operable in a first mode or in a second mode,
wherein the at least one processor is configured to, in generating the primary response data, in the first mode, generate the primary response data in which an interjection and specific content are included, and in the second mode, generate the primary response data that includes either an interjection alone or the specific content alone.

6. The voice processing apparatus according to claim 3, wherein the voice processing apparatus is operable in a prohibition mode,
wherein the at least one processor is configured to, in the prohibition mode, generate the secondary response data without an interjection with 2 or less syllables being repeated.

7. The voice processing apparatus according to claim 4, wherein the voice processing apparatus is operable in a prohibition mode, wherein the at least one processor is configured to, in the prohibition mode, generate the secondary response data without an interjection with 2 or less syllables being repeated.

8. The voice processing apparatus according to claim 5, wherein the voice processing apparatus is operable in a prohibition mode,
wherein the at least one processor is configured to, in the prohibition mode, generate the secondary response data without an interjection with 2 or less syllables being repeated.

9. The voice processing apparatus according to claim 1, wherein the repetition target is one of a plurality of words that are pre-stored.

10. A voice processing method comprising:
receiving, by at least one processor, an inputted voice from a user and perform language analysis on the inputted voice;
obtaining, by the at least one processor, a primary response data representative of a response to the inputted voice from a database;
analyzing, by the at least one processor, whether the primary response data includes an interjection with 2 or less syllables, wherein the interjection is included in a repetition target;
in a case where the analyzed primary response data is determined to include the interjection with 2 or less syllables, generating a voice sequence from a secondary response data that includes the repetition target repeated at least twice;
synthesizing, by the at least one processor, a voice based on the voice sequence; and
outputting the synthesized voice in digital form that includes the secondary response data.

11. A non-transitory computer readable medium storing executable instructions, the executable instructions when executed by at least one processor performs a voice processing method, the method comprising:
receiving an inputted voice from a user and perform language analysis on the inputted voice;
obtaining a primary response data representative of a response to the inputted voice from a database;
analyzing whether the primary response data includes an interjection with 2 or less syllables, wherein the interjection is included in a repetition target;
in a case where the analyzed primary response data is determined to include the interjection with 2 or less syllables, generating a voice sequence from a secondary response data that includes the repetition target repeated at least twice;
synthesizing a voice based on the voice sequence; and
outputting the synthesize voice in digital form that includes the secondary response data.

* * * * *